(No Model.)
W. BOISEN.
GLASS CUTTER'S COMBINED FRAME AND SQUARE.
No. 362,354. Patented May 3, 1887.
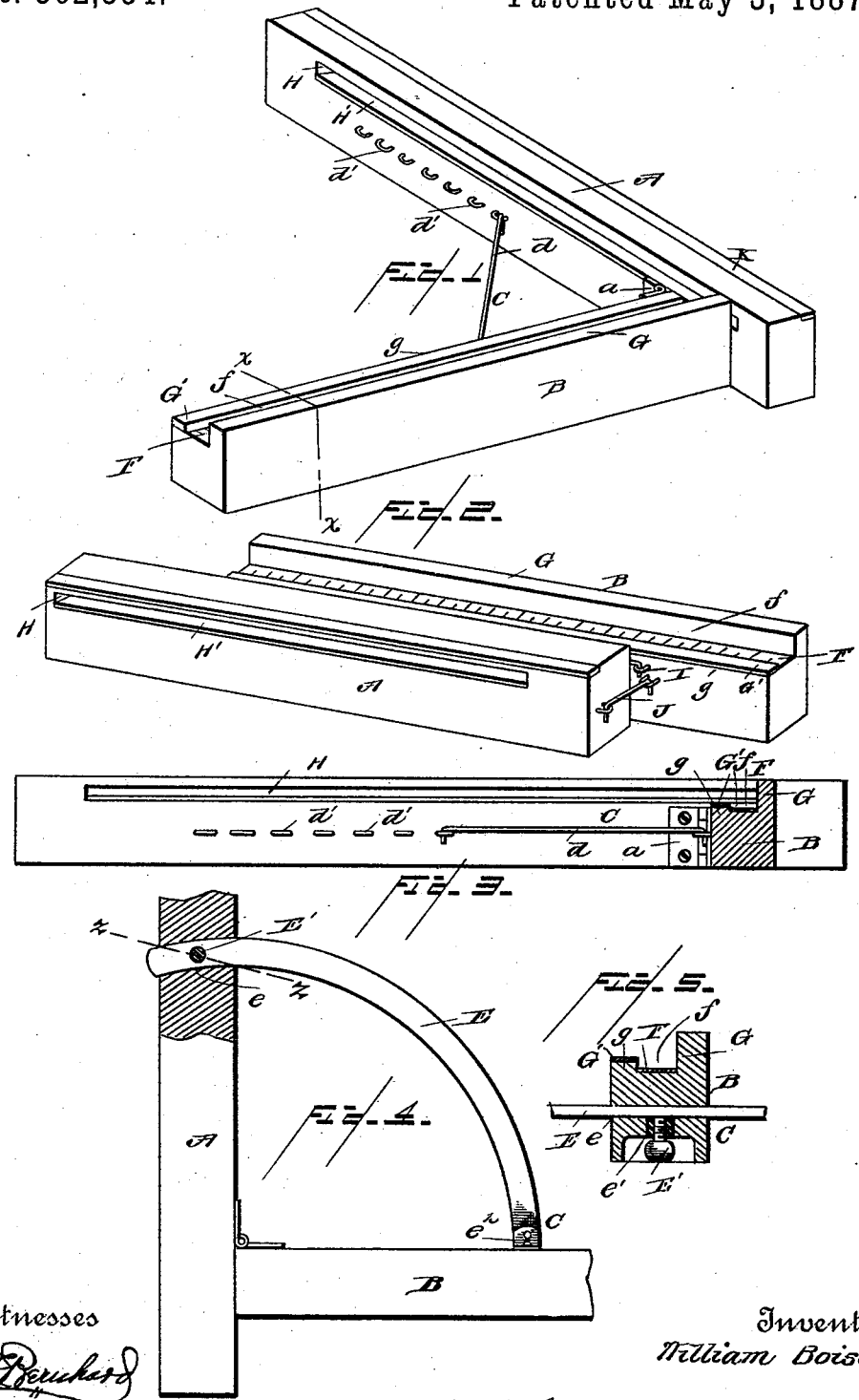
Witnesses
Inventor
William Boisen.
By his Attorneys
Edson Bros.

UNITED STATES PATENT OFFICE.

WILLIAM BOISEN, OF LUZERNE, IOWA.

GLASS-CUTTER'S COMBINED FRAME AND SQUARE.

SPECIFICATION forming part of Letters Patent No. 362,354, dated May 3, 1887.

Application filed December 14, 1886. Serial No. 221,503. (No model.)

*To all whom it may concern:*

Be it known that I, WILLIAM BOISEN, a citizen of the United States, residing at Luzerne, in the county of Benton and State of Iowa, have invented certain new and useful Improvements in Glass-Cutters' Combined Frame and Square, of which the following is a specification, reference being had therein to the accompanying drawings.

My invention relates to improvements in a combined frame and square for cutting glass; and it consists of the peculiar combination of devices and novel construction and arrangement of the various parts for service, substantially as hereinafter fully described, and particularly pointed out in the claims.

The primary object of my invention is to provide an improved implement for glass-cutters' use, the sections of which can be readily adjusted and held in position for cutting one edge of a pane of glass at right angles (or at any other desired angle) to the other edge of the said pane, thereby adapting the pane of glass to be cut square or at an angle, as may be desired or necessary.

A further object of my invention is to provide an improved implement of the class named which can be compactly folded together for storage or transportation, so that it can be easily carried; and, finally, to provide the implement with means for preventing the glass from slipping or becoming displaced while it is being adjusted or operated on in the implement.

In the accompanying drawings, which illustrate a combined frame and square embodying my invention, Figure 1 is a perspective view of the implement adjusted for service. Fig. 2 is a like view showing the device folded for transportation. Fig. 3 is an elevation of the device in the position shown in Fig. 1, one section of the implement being shown in section. Fig. 4 is a bottom plan view, partly in section, of a modified form of my invention; and Fig. 5 is a vertical transverse section on the line $z$ $z$ of Fig. 4.

Referring to the drawings, in which like letters of reference denote corresponding parts in all the figures, A and B designate the sections of my improved combined frame and square for glass-cutters' use, which are hinged or pivotally connected together. One end of the section B is hinged to the section A at one side thereof, and near the end, as shown at $a$, so that the sections can be arranged at right angles to one another, and the section B will bear against the section A, as shown, to thereby prevent the sections from further outward movement in unfolding the implement for use. These sections A B can be arranged at right angles to each other to cut a pane of glass square, or at any other angle less than a right angle, and they are held in their adjusted position by means of locking mechanism or devices C, two forms of which are shown herein—one in Figs. 1 to 4, inclusive, and the other in Fig. 5.

The locking device shown in Figs. 1 to 4, inclusive, comprises a pivoted rod or hook, $d$, which is connected to one of the sections, as B, and a series of eyes or staples, $d'$, which are rigidly affixed or secured to the other section, as A, and are arranged in line with each other and equidistant, as shown. The hook or rod is adapted to be fitted in any one of these eyes or staples to hold the sections in their adjusted positions. When the sections are arranged at right angles to each other, the free end of the hook or rod is fitted in the first staple or eye nearest the hinge between the sections; but when the sections are arranged at any other angle less than a right angle the free end of the hook is fitted in the eye or staple which is necessary to maintain the sections in their adjusted position. In the other form of locking mechanism shown in Fig. 5 one of the sections is provided with a transverse horizontal slot, $e$, and a recess or passage, $e'$, at right angles to and opening into the slot. A segment, E, is pivoted at one end to the other section, as at $e^2$, and the free end of this segment passes through the horizontal slot, as shown. A binding-screw, E', is suitably supported in a fixed threaded bearing in the section having the horizontal slot, and this screw bears or impinges upon the segment to hold the latter from movement, and therefore the two hinged sections of the frame or square. The binding-nut is housed or located in the vertical recess in the slotted section of the frame and square, and the recess is of sufficient size to permit the operator's fingers and thumb to be inserted therein to rotate the nut, which is prevented from extending below the lower edge of the slotted section of the square, in order that the latter may rest or assume a horizontal level position.

The section B of the combined frame and square is provided with a channel or groove, f, in its upper side, and in this groove or channel is affixed or secured a scale, F; or the scale can be painted or otherwise indelibly inscribed on the upper side of the section B of the square, in which event the channel or groove is dispensed with. The outer edge of the section B of the frame and square is provided with a vertical abutment or ledge, G, on its upper side, thereby forming a horizontal rest or support, g, which constitutes the upper surface of the section B and includes the scale F thereon. The pane of glass is adapted to be placed or rested on this support g of the section B, and one edge of the pane of glass abuts against the vertical ledge or abutment G, which rises above the plane of the support g. The support g has a bearing surface or cushion of elastic or yielding material, G′, preferably of rubber or leather, in order to prevent breaking the glass.

The section A of the square is further provided with a longitudinal horizontal slot, H, which lies in the plane of the upper surface or support, g, of the section B of the frame and square, in order that the pane of glass shall assume a horizontal position when it is fitted in the frame to be cut. The lower sides, and, if desired, the upper side, of this longitudinal slot in the section A may be covered by elastic cushions, H′, of rubber or leather, the same as the surface g of the section B, thereby effectually preventing the glass from becoming broken when adjusting it in and removing it from the frame, and also preventing it from slipping therein when it is being operated upon, which is very desirable.

The section of the frame and square to which the swinging hook or rod d is connected is provided near one end with a fixed ring or eye, I, in which the free end of the hook or rod is adapted to be fitted when the sections of the frame or square are folded together, in order to prevent breakage to the rod and annoyance to the operator in moving and transporting the implement.

The sections of the frame are adapted to be folded upon one another, and when in this position they are detachably connected together by a locking device, J, as shown in Fig. 2, which preferably consists of a pivoted hook on one section and a fixed eye on the other section, although this form of locking device can be varied and changed at pleasure.

This being the construction of my improved frame and square for glass-cutters' use, the operation thereof is as follows: The sections are unfolded to the desired position and the locking devices operated to hold them in their adjusted positions. The pane of glass to be operated upon is passed through the horizontal longitudinal slot in the section A and moved until one edge thereof rests upon the upper surface, g, of the section B and the edge bears against the abutment or ledge G of the said section. The pressure of the operator's hand upon the pane of glass, combined with the resistance offered to its movement by the resilient cushions, holds the pane from movement while a suitable cutting implement is drawn along the outer side edge of the section A, the glass having been adjusted the necessary distance, as can be ascertained by consulting the scale F, so that the necessary quantity of surplus glass can be cut off or severed. The sections can be adjusted at the desired angle to each other with ease and facility, and also locked and held against movement, and the material or work is held against displacement in the frame. The device can be readily folded compactly together and locked, which is desirable in carrying and transporting it.

My invention is simple and strong in construction, easily operated, accurate, and can be manufactured for a small sum.

The implement can be made of different sizes for cutting large and small panes of glass, and changes in the form and proportion of parts can be made without departing from the principle or sacrificing the advantages of my invention.

The outer edge of the section A of the combined frame and square is provided with a metallic plate, K, which is rigidly affixed thereto. The implement employed for cutting the glass is drawn along this metallic edge of the section A, and the plate or edge takes up the wear that would otherwise come upon the section and insures an easy and rapid movement of the cutting implement.

Having thus fully described my invention, what I claim as new, and desire to secure by Letters Patent, is—

1. A combined frame and square comprising the hinged or pivoted sections adjustable at an angle to each other, one section having a horizontal slot and the other a fixed abutment or ledge arranged in substantially the same horizontal plane as the slot, substantially as described, for the purpose set forth.

2. A combined frame and square comprising the section A, having the longitudinal slot, the section B, hinged to the section A to be adjustable at an angle thereto, and having the fixed ledge or abutment arranged to one side of the upper surface, g, thereof, and mechanism, substantially such as herein described, for locking the sections at an angle to each other, substantially as described, for the purpose set forth.

3. A combined frame and square comprising the slotted section A, having the resilient cushion, the section B, hinged to the section A, and having the fixed abutment and the resilient cushion arranged to one side of and beneath the abutment, and mechanism for locking the sections at right angles to each other, substantially as described, for the purpose set forth.

4. A combined frame and square comprising the section A, having the longitudinal slot and the fixed eyes or staples arranged beneath the plane of the slot, the section B, hinged to the section A and having the fixed abutment, and the hook connected at one end to the section B and adapted to take into one of the fixed eyes on the section A, substantially as described, for the purpose set forth.

5. A combined frame and square comprising the hinged or pivoted sections, one section having a slot and the other a fixed abutment, and a scale arranged beneath and to one side of the abutment, and means for locking the sections at an angle, as and for the purpose set forth.

In testimony whereof I affix my signature in presence of two witnesses.

WILLIAM BOISEN.

Witnesses:
WILLIAM W. YOCOM,
TOWNSEND BROOMHALL.